May 10, 1949.　　　C. W. CRUMRINE　　　2,469,454
ANIMAL TRAP
Filed March 26, 1946　　　　　　　　　2 Sheets-Sheet 1
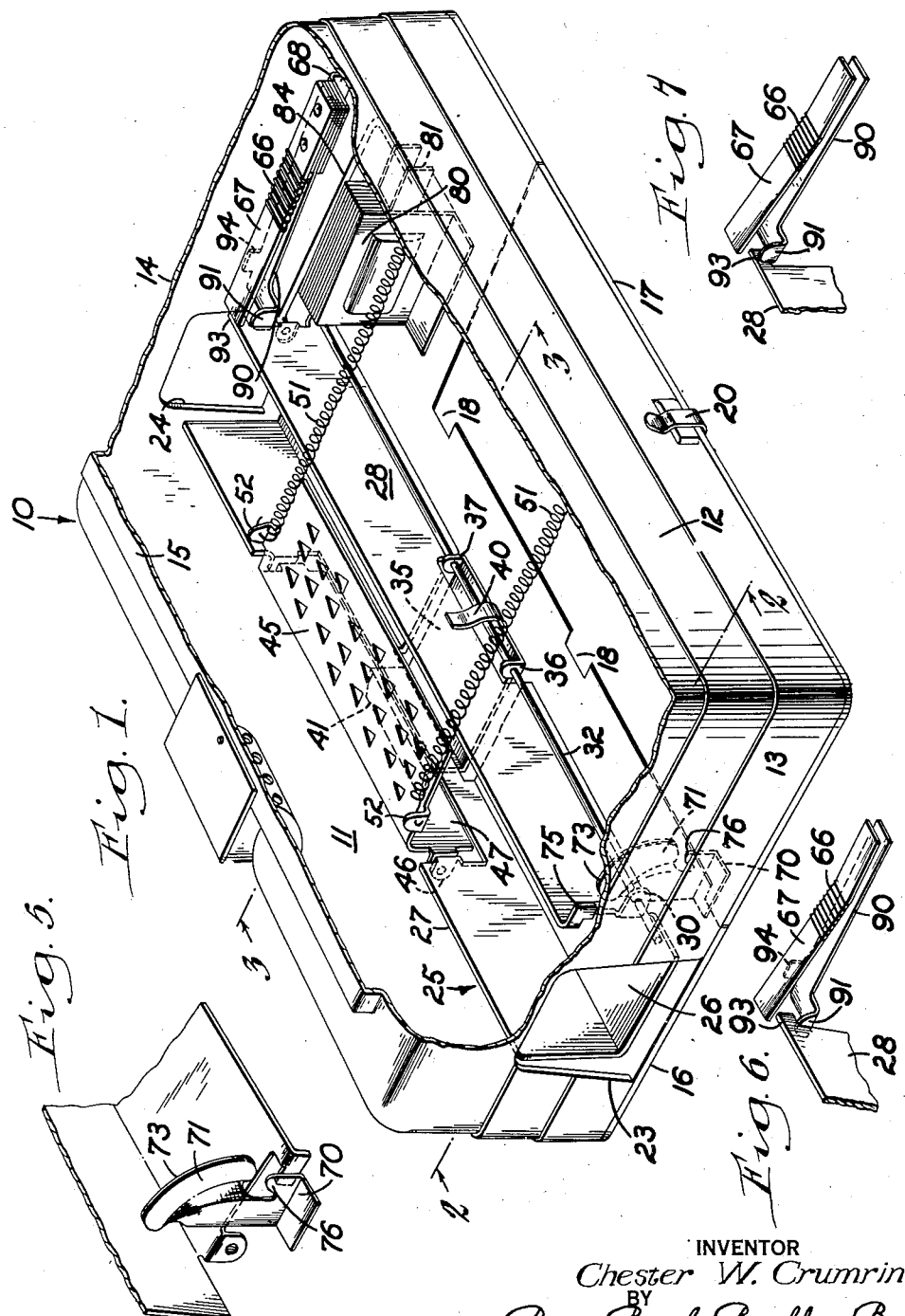
INVENTOR
Chester W. Crumrine
BY
Beau, Brooks, Buckley & Beau.
ATTORNEYS

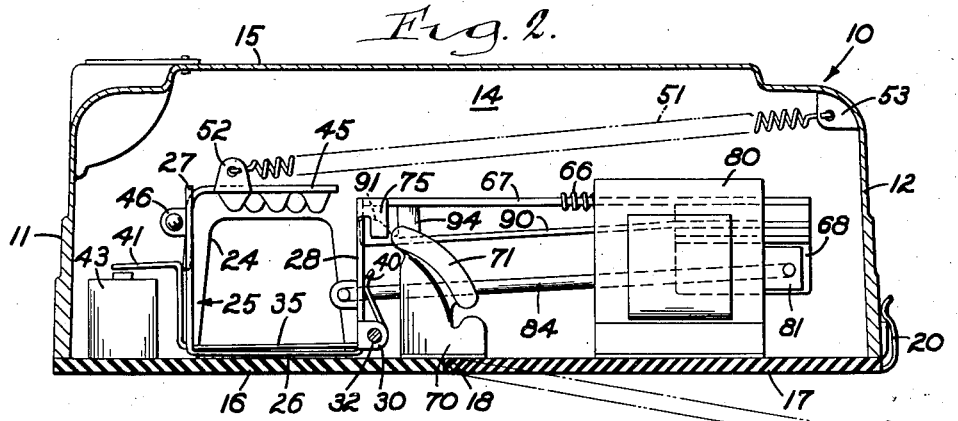
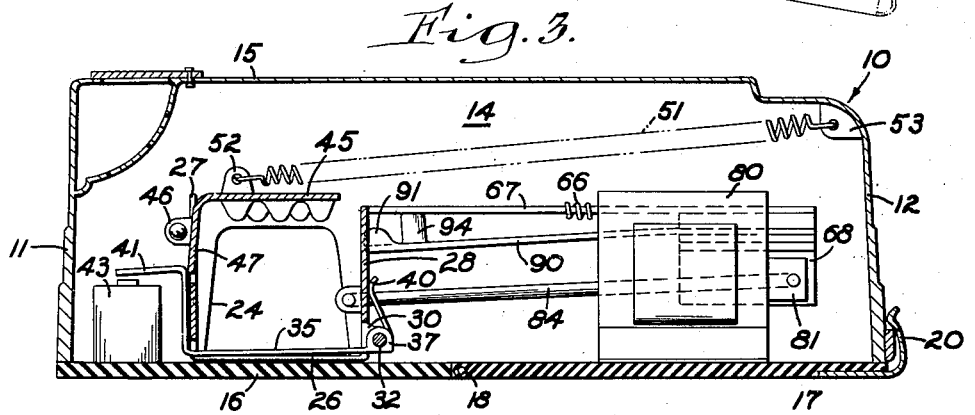
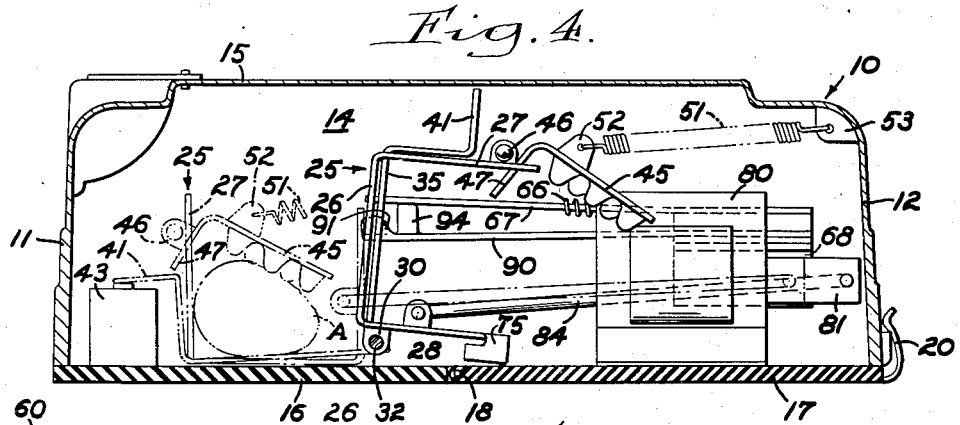
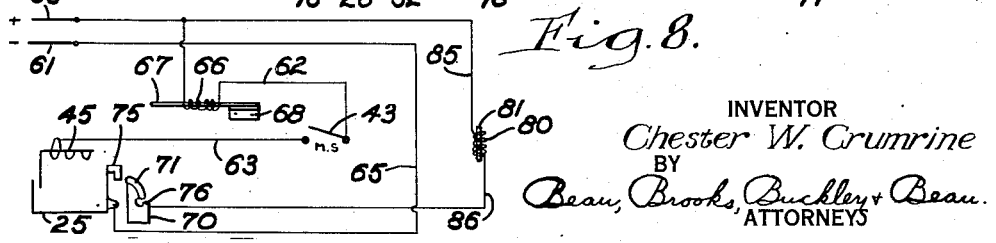

Patented May 10, 1949

2,469,454

UNITED STATES PATENT OFFICE 2,469,454

ANIMAL TRAP

Chester W. Crumrine, Irondequoit Township, Monroe County, N. Y., assignor, by mesne assignments, to L F C Corporation, Rochester, N. Y., a corporation of New York Application March 26, 1946, Serial No. 657,129

14 Claims. (Cl. 43—99)

This invention relates to animal traps and particularly to a trap which operates automatically to accomplish a trapping and resetting cycle of operation.

The trap of the present invention is arranged in such manner that, after an initial impulse arising from the presence of an animal in a predetermined trapping area, successive steps of animal trapping, electrocution, body disposal, and resetting are carried on automatically and in a simple and efficient manner. The trap of the present invention is electrically operated and is so arranged that a single electromotive means in the form of a solenoid or electromagnet, acting in cooperation with springs or other suitable energy-storing means, accomplishes all of the necessary movements incidental to trapping, electrocuting, removal of the animal body to a desired point, and resetting.

The animal trap of the present invention presents various other advantages in construction and operation which will occur to those skilled in the art from a consideration of the following detailed specification and the accompanying drawings. While a full and complete embodiment is set forth herein by way of illustration, it is to be understood that the principles of the invention are not limited execpting as defined in the appended claims.

In the drawings:

Fig. 1 is a general perspective view of one form of the trap of the present invention with portions of the casing thereof broken away to show the interior arrangement;

Fig. 2 is a transverse cross-sectional view taken in a vertical plane approximately along the line 2—2 of Fig. 1;

Fig. 3 is a transverse cross-sectional view taken in a vertical plane substantially along the line 3—3 of Fig. 1;

Fig. 4 is a view similar to Fig. 2 but with the movable parts shown in another position of the cycle of operation;

Fig. 5 is a fragmentary perspective view of an end portion of the animal ejecting means;

Fig. 6 is a fragmentary perspective view of an opposite end portion of the animal ejecting means;

Fig. 7 is a view similar to Fig. 6 but with the parts in another position of operation; and Fig. 8 is a wiring diagram showing the circuit arrangements schematically.

Throughout the several figures of the drawings, like characters of reference denote like parts and the numeral 10 designates generally a casing having side walls 11 and 12, end walls 13 and 14, and a top or closure 15. In the form illustrated in the drawings a bottom or floor 16 of synthetic resin or other insulating material is provided and floor 16 is provided with a downwardly opening door element 17 which may also be of insulating material and is hinged to the floor 16 as at 18 and a spring latch 20 may be provided for normally retaining door 17 in closed position.

End walls 13 and 14 have aligned openings 23 and 24, respectively, and a channel element 25 extends between the openings 23 and 24 with its web portion 26 normally resting upon floor 16 and its opposite flanges 27 and 28 extending upwardly. Channel 25 thus provides a passage through the trap extending the full length between the openings 23 and 24.

Channel 25 operates as an animal body ejecting trough in a manner which will appear later herein and to this end it is provided with a pair of ears 30, one at each end projecting outwardly from flange 28 thereof, whereby the channel is mounted upon a pivot rod 32 which may be supported at its ends in the end walls 13 and 14 or in any other convenient manner.

The center portion of the web 26 of channel 25 is cut away to accommodate a treadle platform 35 which is likewise pivoted upon pivot rod 32 as at 36 and 37. Treadle 35 includes a resilient ear 40 which engages against the outside of flange 28 of channel 25 to normally maintain the treadle 35 in the position illustrated in Figs. 2 and 3. Treadle 35 has an extension 41 formed thereon which is normally disposed above the push bottom of a micro-switch 43. Spring ear 40 is of relatively low resistance so that the mere weight of a small animal such as a mouse upon the treadle depresses the same by pivotal movement about pivot rod 30 and causes the extension 41 to close micro-switch 43.

A pivoted grid plate 45 is disposed above the animal passageway in channel 25 when the trap is in set position as indicated in Figs. 2 and 3. As thereshown, the grid 45 is pivoted to flange 27 of channel 25 as at 46, and a downward flange 47 of grid 45 is latched by the extension 41 of treadle 35 against downward pivotal movement of grid 45 when the trap is in the set position illustrated in Figs. 2 and 3.

Both the channel 25 and grid 45 are electrically insulated from each other and form the other parts of the trap by the provision of suitable insulating bushings and insulating washers in their pivotal connections with each other and by insulating the seatings or bearings of pivot rod 32 in the end walls 13 and 14.

A pair of extension coil springs 51 engage ears 52 formed on grid plate 45 and are anchored at their opposite ends to the casing 10 as at 53. It will be seen from the foregoing that the downward movement of treadle 35 and the extension 41 thereof which closes micro-switch 43 likewise releases flange 47 and permits springs 51 to immediately pivot grid 45 downwardly to the dot and dash line position of Fig. 4 where an animal body A is schematically indicated as clamped between grid plate 45 and the interior of channel 25. At this time springs 51 continue to exert a tensile force and tend to rotate the entire ejector trough which comprises channel 25 about pivot rod 32. This movement is temporarily delayed and prevented in a manner which will presently appear.

Referring now to the wiring diagram, Fig. 8, the numerals 60 and 61 designate the opposite conductors of an ordinary 110 volt power supply and one terminal of micro-switch 43 is connected to one of the conductors 60 by means of a lead 62. The other terminal of micro-switch 43 is connected to grid 45 by a conductor designated 63, the grid 45 being indicated schematically in Fig. 8. As a practical matter the terminal from this side of micro-switch 43 may have a lead connecting it to the anchored end of one of the springs 51 whereby such spring serves to conduct current from micro-switch 43 to grid 45. To this end the anchor 53 of the spring 51 which serves as a conductor will either be of insulating material or will be provided with an insulating bushing for receiving the associated end of spring 51.

As shown in Fig. 8, a conductor 65 permanently connects channel 25 to the opposite conductor 61 of the power supply. It will be seen from the foregoing that whenever micro-switch 43 is closed, the grid 45 and channel 25 comprise opposite electrodes which, when they simultaneously engage an animal body, effect electrocution thereof.

Conductor 62 includes a resistance winding 66 which is disposed about a bi-metal latch bar 67 which is fixed at one end as to a bracket 68 carried by end wall 14. The other end of the bi-metal latch bar normally prevents clockwise rotation of channel 25 as shown in Fig. 1. When micro-switch 43 closes, resistance winding 66 is energized and the bi-metal latch 67 is heated until it curves upwardly sufficiently to release channel 25 which is thereupon quickly rotated in a clockwise direction to full line position illustrated in Fig. 4 by further action of the springs 51. The bi-metal 67 and resistance winding 66 will be proportioned to delay this further movement of the parts until a sufficient time period for certain electrocution has elapsed.

It will be noted that simultaneously with movement of channel 25 to the full line position of Fig. 4, grid 45 is swung to an open position whereby the quick swing of channel 25 throws the animal body freely to the right as shown in Fig. 4 with sufficient force to cause the deposit of electrocuted animal bodies at the right-hand side of casing 10 where they will rest upon the door element 17.

Secured to the floor 16 of the trap casing is a bracket 70 having an arcuately extending contact strip 71, see Figs. 1, 2, and 5. The bracket 70 is formed of resilient material whereby the strip 71 flexes rather freely under pressure. One face of the strip 71 has fixed thereto a strip of insulating material as at 73. It will be noted that the right-hand upward flange 28 of channel 25 has a contact tab 75 formed thereon. Arcuate contact strip 71 extends obliquely so that when channel 25 swings from the dot and dash line position of Fig. 4 to the full line position, tab 75 rides along the insulating strip 73 and flexes bracket 70 to the left as viewed in Figs. 1 and 5.

When tab 75 rides off the lower end of strip 71 it engages against a contact ear 76 formed on bracket 70 and closes an energizing circuit for an electromagnet winding designated 80. This energization moves an armature 81 associated with the electromagnet 80 to the left as viewed in Figs. 2 through 4 and a link 84 connects pivotally between armature 81 and flange 28 of channel 25 to return the channel 25 to its original preset full line position of Figs. 1 through 3.

Referring to the wiring diagram, Fig. 8, it will be noted that electromagnet winding 80 has one end connected to conductor 60 of the power supply by means of a conductor 85 and its other end connected to bracket 70 by a conductor 86.

The oblique arrangement of strip 71 is such that upon return rotative movement of channel 25 the tab 75 of the latter rides against the left-hand face of strip 71 as viewed in Figs. 1 and 5 and therefore continues the closed circuit condition of electromagnet winding 80 until channel 25 is fully returned.

To allow for cooling of the bi-metal latch 67 an auxiliary resilient latch 90 is mounted therewith. Latch 90 has a terminal upstanding ear 91 which extends slightly beyond the end of bi-metal latch 67 so that, in the positon of Fig. 2, an ear 93 extending from the adjacent end of flange 28 of channel 25, see Figs. 1 and 6, holds ear 91 downwardly and thus holds the auxiliary latch 90 in a slightly flexed downward position. By reason of this arrangement ear 91 does not interfere with free clockwise rotative movement of channel 25 to eject an animal and the beginning of such movement is illustrated in Fig. 6.

However, upon return movement of channel 25, link 84 moves the same sufficiently upon the position illustrated in Fig. 1 to cam ear 93 over ear 91 to the latched position illustrated in Fig. 7. As bi-metal 67 cools and returns to its downward position it engages an upstanding lug 94 formed on auxiliary latch 90 and moves it downwardly substantially out of interfering position, whereupon channel 25 may rotate a short clockwise distance until its ear 93 is in abutment with the end of bi-metal latch 67, whereupon the trap is fully reset for a subsequent trapping cycle.

It will be noted also that return movement of channel 25 under the force of link 84 results in automatic re-engagement of downward flange 47 of grid 45 against the extension 41 of treadle platform 35 to automatically reset grid 45 to the position illustrated in Figs. 1, 2, and 3.

What is claimed is:

1. An animal trap comprising a casing and a continuous animal passageway therethrough, a channel forming a floor and opposed side walls of said passageway, means mounting said channel for pivotal movement about a longitudinal axis adjacent one side of said passageway and means normally holding said channel against pivotal movement, an animal disposal zone at said side of said passageway, an electrocuting grid pivoted to the other side of said channel and normally extending above said passageway, spring means normally urging said grid for pivotal movement and operable upon actuation of the trap to swing said grid downwardly against an animal in said passageway to entrap and electrocute said animal, time delay means effective subsequently to release said channel holding means and thereby render said spring means effective to rotate the channel about its pivot axis and throw the animal body from within said channel to said disposal zone, and electromotive means effective upon completion of the animal throwing movement of the channel for automatically restoring the channel and the grid to preset position.

2. An animal trap comprising a casing and a continuous animal passageway therethrough, a channel forming a floor and opposed side walls of said passageway, means mounting said channel for pivotal movement about a longitudinal axis adjacent one side of said passageway and means normally holding said channel against pivotal movement, an animal disposal zone at said side of said passageway, an electrocuting grid pivoted to the other side of said channel and normally disposed clear of said passageway, spring means normally urging said grid for pivotal movement and operable upon actuation of the trap to swing said grid downwardly against an animal in said passageway to entrap and electrocute said animal, and time delay means effective subsequently to release said channel holding means and thereby render said spring means effective to rotate the channel about its pivot axis and throw the animal body from within said channel to said disposal zone.

3. An animal trap comprising a casing and a continuous animal passageway therethrough, a channel forming a floor and opposed side walls of said passageway, means mounting said channel for pivotal movement about a longitudinal axis adjacent one side of said passageway and means normally holding said channel against pivotal movement, an animal disposal zone at said side of said passageway, an electrocuting grid pivoted to the other side of said channel and normally disposed clear of said passageway, force means normally urging said grid for pivotal movement and operable upon actuation of the trap to swing said grid downwardly against an animal in said passageway to entrap and electrocute said animal, time delay means effective subsequently to release said channel holding means and thereby render said force means effective to rotate the channel about its pivot axis and throw the animal body from within said channel to said disposal zone, and means effective upon completion of the animal throwing movement of the channel for automatically restoring the channel and the grid to preset position.

4. An animal trap comprising a casing and means therein defining a continuous animal passageway therethrough, means mounting said passage defining means for pivotal movement about a longitudinal axis adjacent one side of said passageway and means normally holding said passage defining means against pivotal movement, an animal disposal zone at said side of said passageway, an electrocuting grid pivoted to the other side of said passage defining means and normally disposed clear of said passageway, spring means normally urging said grid for pivotal movement and operable upon actuation of the trap to swing said grid downwardly against an animal in said passageway to entrap and electrocute said animal, time delay means effective subsequently to release said holding means and thereby render said spring means effective to rotate the passage defining means about its pivot axis and throw the animal body from within said passage defining means to said disposal zone, and electromotive means effective upon completion of the animal throwing movement of the passage defining means for automatically restoring the channel and the grid to preset position.

5. An animal trap comprising a casing and means therein defining a continuous animal passageway therethrough, means mounting said passage defining means for pivotal movement about a longitudinal axis adjacent one side of said passageway and means normally holding said passage defining means against pivotal movement, an animal disposal zone at said side of said passageway, an electrocuting grid pivoted to the other side of said passage defining means and normally disposed clear of said passageway, spring means normally urging said grid for pivotal movement and operable upon actuation of the trap to swing said grid downwardly against an animal in said passageway to entrap and electrocute said animal, and time delay means effective subsequently to release said holding means and thereby render said spring means effective to rotate the passage defining means about its pivot axis and throw the animal body from within said passage defining means to said disposal zone.

6. An animal trap comprising a casing and means therein defining a continuous animal passageway therethrough, means mounting said passage defining means for pivotal movement about a longitudinal axis adjacent one side of said passageway and means normally holding said passage defining means against pivotal movement, an animal disposal zone at said side of said passageway, an electrocuting grid pivoted to the other side of said passage defining means and normally disposed clear of said passageway, force means normally urging said grid for pivotal movement and operable upon actuation of the trap to swing said grid downwardly against an animal in said passageway to entrap and electrocute said animal, means automatically effective subsequently to release said holding means and thereby render said force means effective to rotate the passage defining means about its pivot axis and throw the animal body from within said passage defining means to said disposal zone, and means effective upon completion of the animal throwing movement of the passage defining means for automatically restoring the channel and the grid to preset position.

7. An animal trap comprising a casing and means therein defining a continuous animal passageway therethrough, means mounting said passage defining means for pivotal movement about a longitudinal axis adjacent one side of said passageway and means normally holding said passage defining means against pivotal movement, an animal disposal zone at said side of said passageway, an electrocuting grid pivoted to the other side of said passage defining means and normally disposed clear of said passageway, force means normally urging said grid for pivotal movement and operable upon actuation of the trap to swing said grid downwardly against an animal in said passageway to entrap and electrocute said animal, and means automatically effective subsequently to release said holding means and thereby render said force means effective to rotate the passage defining means about its pivot axis and throw the animal body from within said passage defining means to said disposal zone.

8. An animal trap comprising a casing and a continuous animal passageway therethrough, a channel forming a floor and opposed side walls of said passageway, means mounting said channel for pivotal movement about a longitudinal axis adjacent one side of said passageway, an animal disposal zone at said side of said passageway, an electrocuting grid pivoted to the other side of said channel and normally extending above said passageway, means operable upon actuation of the trap to swing said grid downwardly against an animal in said passageway to entrap and electrocute said animal, and means effective subsequently for causing the channel to rotate about its pivot axis and throw the animal body from within said channel to said disposal zone.

9. An animal trap comprising a casing and a continuous animal passageway therethrough, a channel forming a floor and opposed side walls of said passageway, means mounting said channel for pivotal movement about a longitudinal axis adjacent one side of said passageway, an animal disposal zone at said side of said passageway, an electrocuting grid pivoted to the other side of said channel and normally disposed clear of said passageway, means operable upon actuation of the trap to swing said grid downwardly against an animal in said passageway to entrap and electrocute said animal, and means effective subsequently for causing the channel to rotate about its pivot axis and move the animal body from within said channel to said disposal zone.

10. An animal trap comprising a casing and a continuous animal passageway therethrough, a channel forming a floor and opposed side walls of said passageway, means mounting said channel for pivotal movement about a longitudinal axis adjacent one side of said passageway, an animal disposal zone at said side of said passageway, an electrocuting grid pivoted to the other side of said channel and normally extending above said pasageway, means operable upon actuation of the trap to swing said grid downwardly against an animal in said passageway to entrap and electrocute said animal, means effective subsequently for causing the channel to rotate about its pivot axis and discharge the animal body from within said channel to said disposal zone, and means effective upon completion of the animal discharging movement for automatically restoring the channel and the grid to preset position.

11. An animal trap comprising a casing and a continuous animal passageway therethrough, a channel forming a floor and opposed side walls of said passageway, means movable upon actuation of the trap to clamp an animal body in said channel, said channel and said means comprising spaced opposed electrodes of an electrocuting circuit, means mounting said channel for pivotal movement about a longitudinal axis adjacent one side of said passageway, an animal disposal zone at said side of said passageway, and means for quickly rotating said channel about said axis to throw the animal body from within said channel to said disposal zone.

12. An animal trap comprising a casing and a continuous animal passageway therethrough, a channel forming a floor and opposed side walls of said passageway, means movable upon actuation of the trap to clamp an animal body in said channel, said channel and said means comprising spaced opposed electrodes of an electrocuting circuit, means mounting said channel for pivotal movement about the longitudinal axis adjacent one side of said passageway, an animal disposal zone at said side of said passageway, and means for quickly removing said clamping means and substantially simultaneously rotating said channel about said axis to throw the animal body from within said channel to said disposal zone.

13. An animal trap comprising a casing and means defining a continuous animal passageway therethrough, means movable upon actuation of the trap to clamp an animal body in said passage defining means, said passage defining means and said last-mentioned means comprising spaced opposed electrodes of an electrocuting circuit, means mounting said passage defining means for pivotal movement about a longitudinal axis adjacent one side of said passageway, an animal disposal zone at said side of said passageway, and means for quickly rotating said passage defining means about said axis to throw the animal body to said disposal zone.

14. An animal trap comprising a casing and a continuous animal passageway therethrough, a channel forming a floor and opposed side walls of said passageway, means movable upon actuation of the trap to clamp an animal body in said channel, said channel and said means comprising spaced opposed electrodes of an electrocuting circuit, means mounting said channel for pivotal movement about a longitudinal axis adjacent one side of said passageway, an animal disposal zone at said side of said passageway, means for quickly rotating said channel about said axis to throw the animal body from within said channel to said disposal zone, and means effective upon completion of the animal throwing movement for automatically restoring the channel to preset position.

CHESTER W. CRUMRINE.

REFERENCES CITED

The following references are of record in the file of this patent:

UNITED STATES PATENTS

| Number | Name | Date |
|---|---|---|
| 1,028,435 | Cessna | June 4, 1912 |
| 1,464,697 | Connolly | Aug. 14, 1923 |
| 1,553,135 | Byrnes | Sept. 8, 1925 |
| 2,411,766 | Vincent et al. | Nov. 26, 1946 |